US012447606B2

(12) United States Patent
Vannuffelen et al.

(10) Patent No.: US 12,447,606 B2
(45) Date of Patent: Oct. 21, 2025

(54) SAFETY SYSTEM FOR HAND-GUIDING A ROBOT

(71) Applicant: Mantis Robotics, Inc., Danville, CA (US)

(72) Inventors: Gerry Vannuffelen, Danville, CA (US); Pei Jui Wang, New Taipei (TW)

(73) Assignee: Mantis Robotics, Inc., Danville, CA (US)

( * ) Notice: Subject to any disclaimer, the term of this patent is extended or adjusted under 35 U.S.C. 154(b) by 455 days.

(21) Appl. No.: 17/856,851

(22) Filed: Jul. 1, 2022

(65) Prior Publication Data
US 2023/0001568 A1 Jan. 5, 2023

Related U.S. Application Data

(60) Provisional application No. 63/218,484, filed on Jul. 5, 2021.

(51) Int. Cl.
*B25J 19/06* (2006.01)
*B25J 9/00* (2006.01)
*B25J 13/08* (2006.01)

(52) U.S. Cl.
CPC ........... *B25J 9/0081* (2013.01); *B25J 13/081* (2013.01); *B25J 13/086* (2013.01); *B25J 19/063* (2013.01);
(Continued)

(58) Field of Classification Search
CPC ...... B25J 9/0081; B25J 13/081; B25J 13/086; B25J 19/063; G05B 2219/39384; G05B 2219/39001
See application file for complete search history.

(56) References Cited

U.S. PATENT DOCUMENTS 4,588,348 A * 5/1986 Beni .................. G01V 3/08
414/730
5,363,474 A 11/1994 Sarugaku
(Continued)

FOREIGN PATENT DOCUMENTS

DE 102018219268 3/2020
EP 3147752 A 3/2017
(Continued)

OTHER PUBLICATIONS

Papanastasiou et al. "Towards seamless human robot collaboration: integrating multimodal interaction", The International Journal of Advanced Manufacturing Technology, Springer, London, vol. 105, No. 9, pp. 3881-3897, Jun. 6, 2019.
(Continued)

*Primary Examiner* — Dalena Tran

(57) ABSTRACT

A safety system for allowing a robot having a controller and at least one movable member to be manually guided by a user includes a sensor module is disposed on a surface of the robot that comprises a user-interaction sensor that produces a sensing signal. The sensor module further includes a resilient member having an outer surface. A motion control module is adapted to move the robot through the controller according to a first threshold of the sensing signal. A safety module is adapted for stopping movement of the robot through the controller according to a second threshold of the sensing signal and represents a potential threat of harm to the user.

13 Claims, 12 Drawing Sheets

(52) U.S. Cl.
CPC .............. *G05B 2219/39001* (2013.01); *G05B 2219/39384* (2013.01)

(56) References Cited

U.S. PATENT DOCUMENTS

| | | |
|---|---|---|
| 6,212,443 B1 | 4/2001 | Nagata |
| 9,477,350 B2 | 10/2016 | Sheng |
| 9,522,470 B2 | 12/2016 | Nakagawa |
| 10,144,125 B2 | 12/2018 | Su |
| 10,245,729 B2 | 4/2019 | Bordegnoni |
| 10,252,415 B2 | 4/2019 | Ishii |
| 10,518,424 B2 | 12/2019 | Zillich |
| 10,556,353 B2 | 2/2020 | Su |
| 10,639,799 B2 | 5/2020 | Katou |
| 10,675,767 B2 | 6/2020 | Takaoki |
| 10,710,252 B2 | 7/2020 | Roziere |
| 10,800,032 B2 | 10/2020 | Kamisono |
| 10,828,791 B2 | 11/2020 | Fujita |
| 10,976,460 B2 | 4/2021 | Neel |
| 2011/0193363 A1* | 8/2011 | Nishiwaki .............. G01L 5/167 901/33 |
| 2017/0095925 A1 | 4/2017 | Yamane |
| 2019/0270199 A1 | 9/2019 | Ning |
| 2019/0368658 A1 | 12/2019 | Sato |
| 2020/0130623 A1 | 4/2020 | Baldinger |
| 2020/0338720 A1 | 10/2020 | Yamamoto |
| 2020/0368924 A1 | 11/2020 | Neel |
| 2021/0197381 A1 | 7/2021 | Bordegnoni |
| 2021/0307170 A1* | 9/2021 | Wu ........................ H05K 1/147 |
| 2022/0276038 A1* | 9/2022 | Shen ..................... G01R 33/077 |

FOREIGN PATENT DOCUMENTS

| | | |
|---|---|---|
| FR | 3115719 | 5/2022 |
| JP | S59157715 | 9/1984 |
| JP | S60108285 | 6/1985 |
| JP | 06-008168 A | 1/1994 |
| JP | 3207231 | 9/2001 |
| JP | 3632268 | 3/2005 |
| TW | I634400 | 9/2018 |
| WO | WO2020049230 | 3/2020 |

OTHER PUBLICATIONS

Argall et al. "A survey of Tactile Human-Robot Interactions", Robotics and Autonomous Systems, Elsevier BV, Amsterdam, NL, vol. 58, No. 10, pp. 1159-1176, Oct. 31, 2010.

* cited by examiner

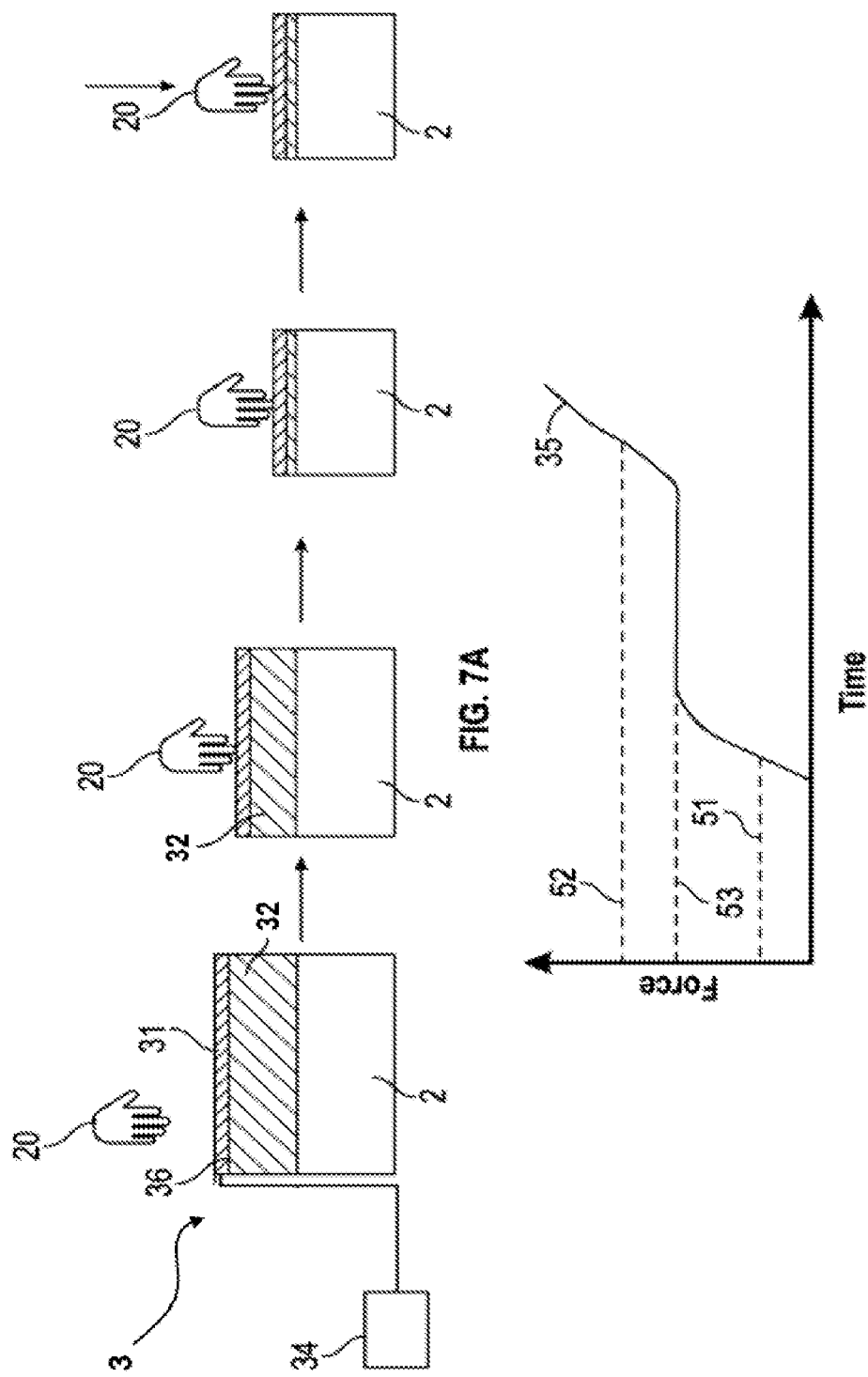

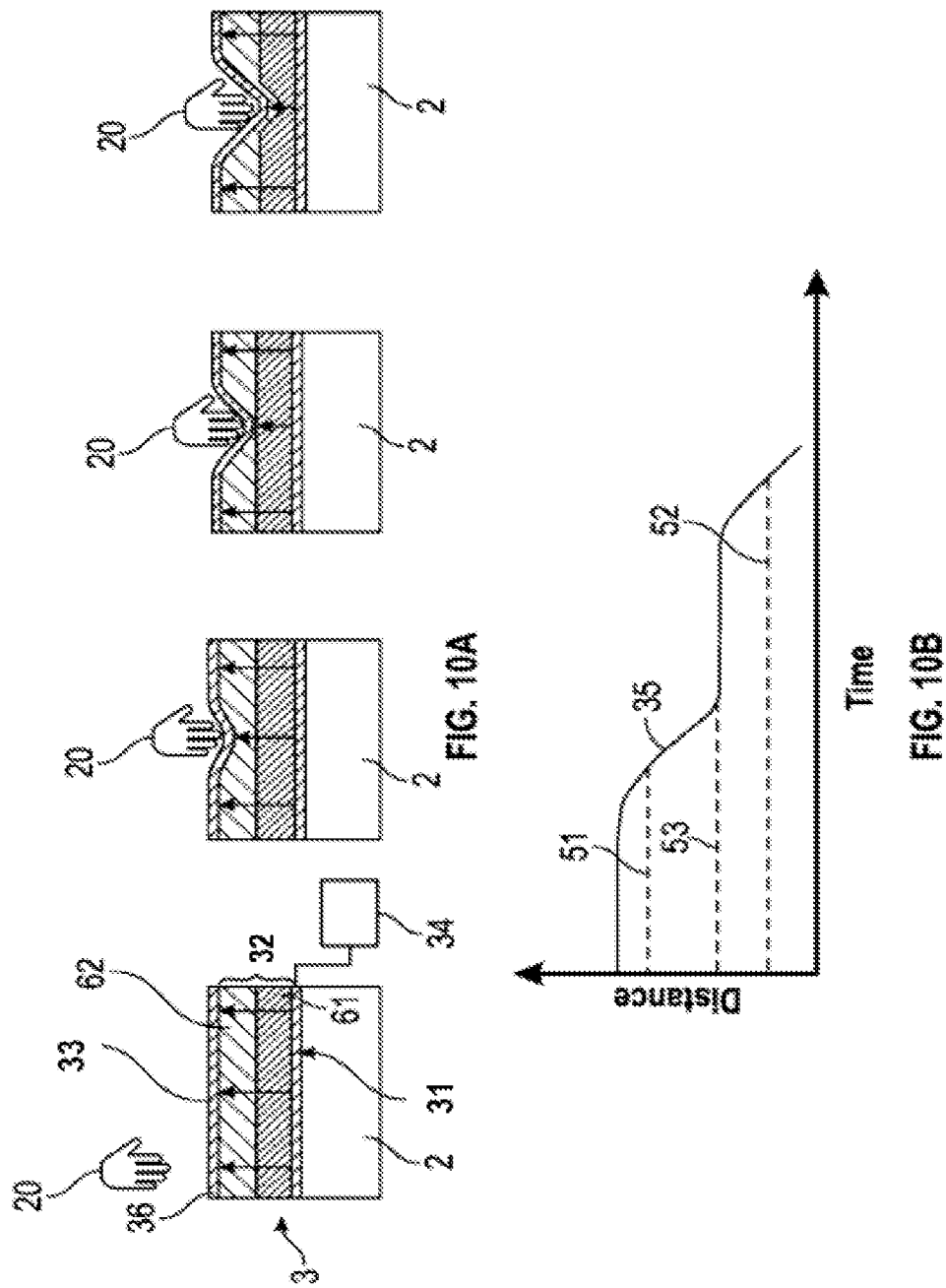

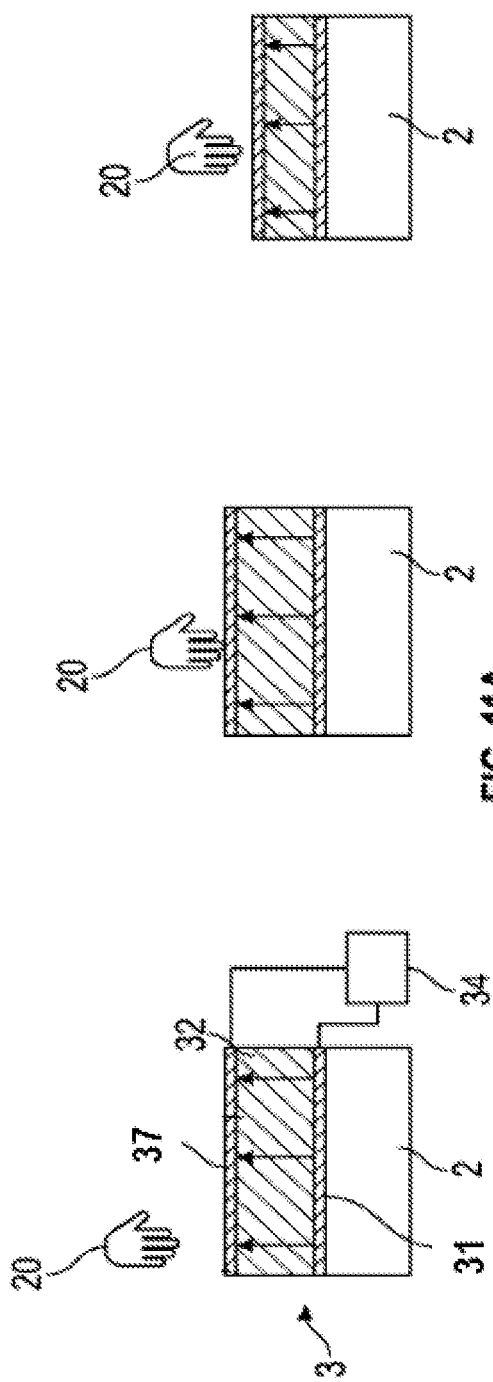
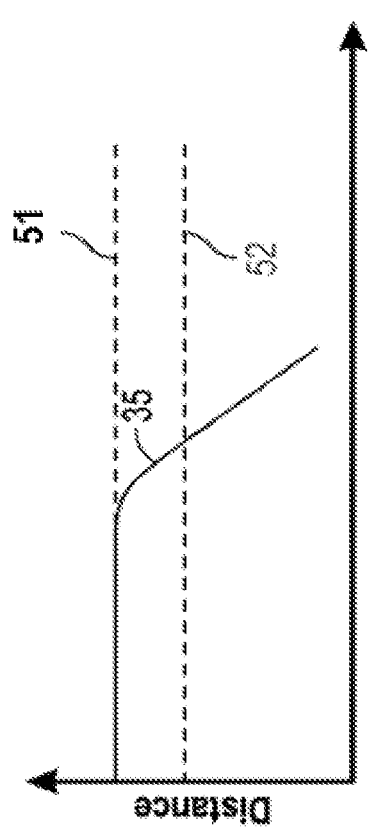
FIG. 11A
FIG. 11B

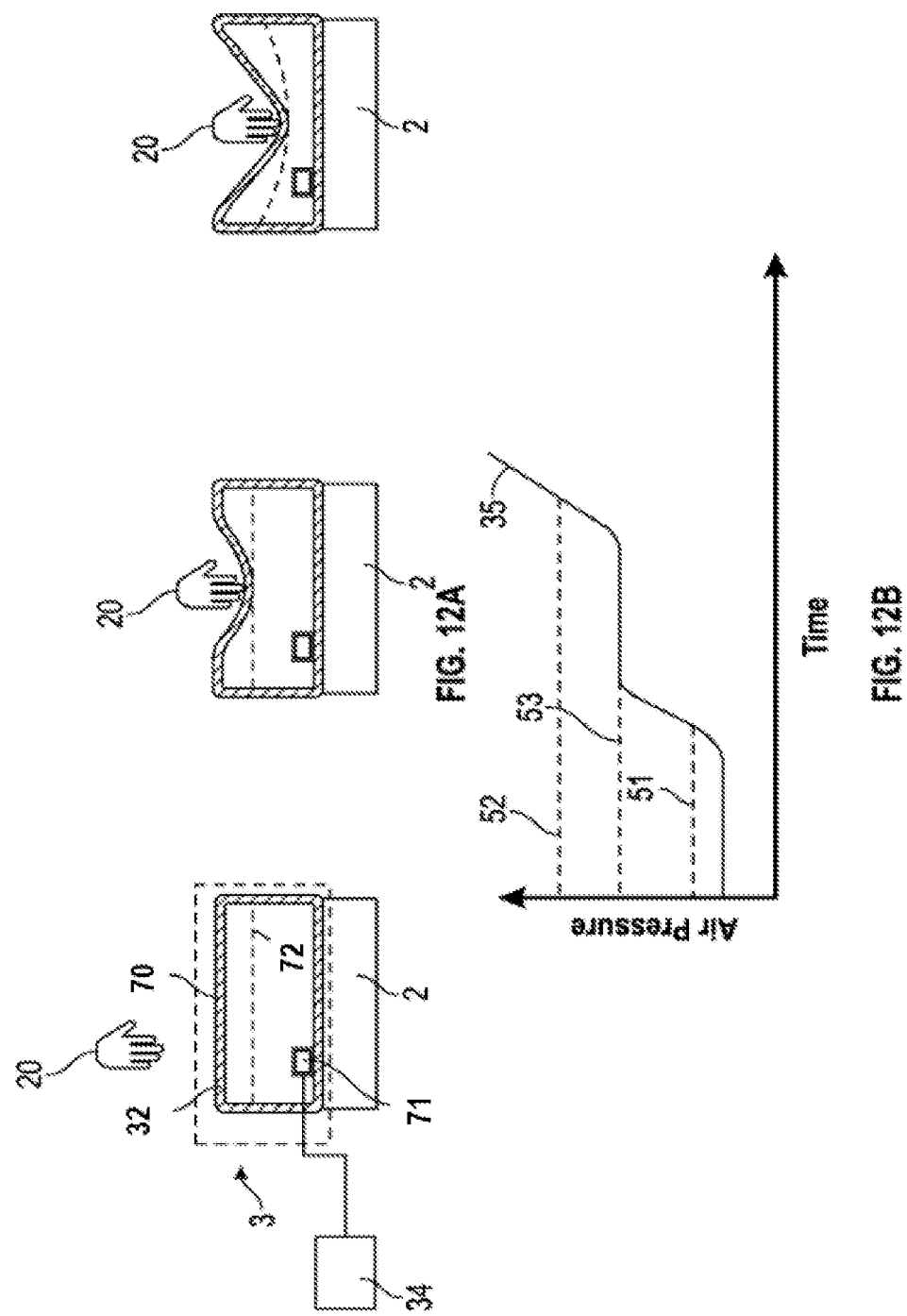

SAFETY SYSTEM FOR HAND-GUIDING A ROBOT

This application claims the benefit of U.S. Provisional Patent Application No. 63/218,484, filed Jul. 5, 2021, which is hereby incorporated by reference herein in its entirety.

FIELD

This disclosure relates to robotics, and more particularly to robotic safety systems.

BACKGROUND

Robotic systems are often used for industrial purposes. Such robotic systems include industrial robots. Care should be taken to ensure that industrial robots operate safely when in close proximity to humans (users).

Industrial robots often equip with a 3-position enabling switch in a teaching pendant for a user to continuously press in a middle position to enable a teaching action (jog) of the robot. If the user fully releases the switch or fully presses the switch, the robot will stop safely. With the introduction of collaborative robots, which typically have a hand guide function to drag the robot in the tool end or the body to move the robot into a desired pose, it becomes inconvenient for a user to hold an enabling switch when performing hand guidance, as the user will only have a single hand free to perform the movement. Furthermore, enabling switches were originally designed to be used when the user jogs the robot from the teaching pendant, whereas in hand-guide implementations the user must put their hand on the robot, even with an enabling switch held presumably by the other hand. The risk that the robot injures the user's hand is much higher in a hand-guide mode than when jogging a robot from a distance with a remote interface, such as on a tablet computer or the like.

Hence, other than the ability to practically hand-guide the robot, integration of a power and force limiting (PFL) function when hand-guiding may also be desirable.

SUMMARY

A safety system is provided for hand guiding a robot that includes multiple movable parts, driven by actuators, and controlled by one or more processor.

The safety system may include a safety cover for the robot that is mounted to one or more of the movable parts. The safety cover may include a sensor disposed on a surface of one of the movable parts. The sensor may include at least one sensor layer. The sensor may include additional layers such as one or more resilient layers and/or a cover layer. In implementations with multiple resilient layers, the resilient layers may have different rigidities. The sensor layer may contact with the movable part, may be interposed between and/or contact the resilient layers, and/or may form the cover layer (e.g., at an exterior or outer surface of the sensor).

The sensor layer may generate sensor signals. The sensor signals may be indicative of an external object that applies a force to the sensor. The external object may, for example, be a body part such as a hand of a user. The external object may approach, contact, and/or apply pressure to one or more of the movable parts to teach or instruct a motion or pose of the movable to the robot. The sensor may detect a distance between the external object and the sensor layer. This distance may be detected via force, pressure, contact, proximity, optical, and/or ultrasonic sensing. The sensor layer may therefore include a force sensor layer, a contact sensor layer, a pressure sensor layer, a proximity sensor layer, an optical sensor layer, and/or a layer used to detect ultrasonic waveforms. If desired, the sensor may include multiple sensor layers of different types, such as an underlying force sensor and an overlying contact sensor.

As an example, the sensor may detect a depression of a layer in the sensor relative to the underlying movable part as produced by contact and/or force applied to the sensor by the external object. The layer may be the sensor layer itself, one or more of the resilient layers, and/or a cover layer. As the amount of force applied by the external object increases, the amount of depression of the layer increases and the sensed distance between the external object and the sensor layer decreases accordingly. The sensor signal generated by the sensor layer may be indicative of the distance between the external object and the sensor layer (or equivalently the amount of depression of the layer). The sensor may pass the sensor signal to one or more processors such as one or more processors used to implement a motion control module and a safety module.

When the sensor signals are indicative of the external object being within a predetermined range of distances from the sensor layer or, equivalently, are indicative of the amount of depression of the layer being within a predetermined range of depressions (e.g., when the sensor signals have a value within a range between a first threshold and a second threshold), the motion control module may control the robot to move one or more of the movable parts. The motion control module may, for example, control the robot to move at least the movable part underlying the sensor according to the motion that the external object is attempting to teach the robot (e.g., according to a manual instruction of guiding being applied to the movable part by the external object). When the sensor signals are indicative of the external object being outside the predetermined range of distances or, equivalently, are indicative of the amount of depression being outside the predetermined range of depressions (e.g., when the sensor signals have a value outside the range between the first and second thresholds, greater than the first threshold, less than the second threshold, etc.), the safety module may perform a safety operation to safely stop movement of the robot (e.g., by cutting power, slowing the motion, etc.).

Multiple embodiments are provided, include different types of sensor that may be used to construct the user-interaction sensor, different types and structures of the resilient member that may present different effects of the safety system for hand guiding a robot. Furthermore, a robot adopted with the safety system that may provide a PFL function during the hand guiding is also introduced. Finally, multiple embodiments of the possible design of the resilient member are disclosed.

BRIEF DESCRIPTION OF THE DRAWINGS

FIG. 7A is a cross-sectional side view of an illustrative sensor module including a contact or force sensor mounted to a resilient member in accordance with some embodiments.

FIG. 7B is a chart of an illustrative sensing signal produced by a sensor module of the type shown in FIG. 7A, illustrating thresholds of the sensing signal in accordance with some embodiments.

FIG. 10A is a cross-sectional side view of an illustrative sensor module including a proximity sensor and an external coverage member in accordance with some embodiments.

FIG. 10B is a chart of an illustrative sensing signal produced by a sensor module of the type shown in FIG. 10A, illustrating thresholds of the sensing signal in accordance with some embodiments.

FIG. 11A is a cross-sectional side view of an illustrative sensor module including a proximity sensor and a contact detecting sensor in accordance with some embodiments.

FIG. 11B is a chart of an illustrative sensing signal produced by a sensor module of the type shown in FIG. 11A, illustrating thresholds of the sensing signal in accordance with some embodiments.

FIG. 12A is a cross-sectional side view of an illustrative sensor module including a deformable air chamber and an air pressure sensor in accordance with some embodiments.

FIG. 12B is a chart of an illustrative sensing signal produced by a sensor module of the type shown in FIG. 12A, illustrating thresholds of the sensing signal in accordance with some embodiments.

DETAILED DESCRIPTION

Figure 1:
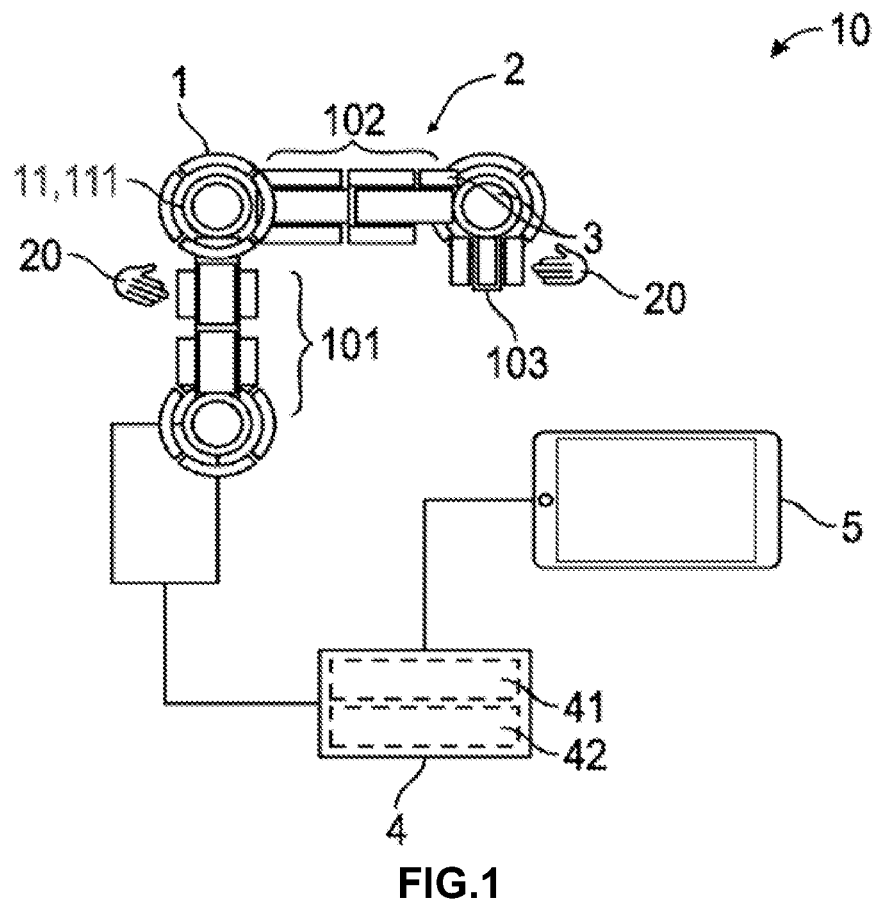
FIG. 1 is a diagram of an illustrative robot system in accordance with some embodiments.

The following description provides specific details for a thorough understanding of and enabling description for the disclosed embodiments. One of ordinary skill in the art will understand that one or more embodiments may be practiced without one or more of such specific details. In some instances, specific description of well-known structures or functions may have been omitted to avoid unnecessarily obscuring the description of the embodiments.

Unless the context clearly requires otherwise, the words "comprise," "comprising," and the like are to be construed in an inclusive sense as opposed to an exclusive or exhaustive sense. The words "herein," "above," "below", when used in this description, refer to this description as a whole and not to any particular portions of this description. When the claims use the word "or" in reference to a list of two or more items, that word covers all of the following interpretations of the word: any of the items in the list, all of the items in the list, and any combination of the items in the list. When the word "each" is used to refer to an element that was previously introduced as being at least one in number, the word "each" does not necessarily imply a plurality of the elements but can also mean a singular element.

Power and force limiting (PFL) is one key of user-robot collaboration in the case that a robot is allowed to move side-by-side with a human user. The robot can be a hand guided robot (e.g., a robot that is taught to perform movements or poses via hand-guidance by the user). In these scenarios, the user is physically located in the same working area as the robot and the robot moves. While the robot is under instruction from the user, and considering user-robot collaboration safety, there is a need to consider a situation where the robot loses control and bumps into the user or clamps a limb or hand of the user. Hence, in ISO 10218-1: 2011 (Robots and robotic devices—Safety requirements for industrial robots—Part 1: Robots), hand guidance is required to be performed with an emergency stop button and an enabling switch mounted close to a tool end of the robot. In its extension, ISO/TS 15066:2016 (Robots and robotic devices—Collaborative robots), PFL is considered as an important method for reducing the risk of hand guidance injuries. Having a safety rated PFL function may replace the requirement to mount emergency stop switches and enabling devices to the tool end, or the guiding device of a robot. In the perspective of user-robot collaborative safety, the safety rated PFL is more comprehensive than the combination of emergency stop switches and enabling switches, because the latter involves reaction time and judgement of the user during operation. For example, when the robot loses control during hand guidance, if the user does not immediately operate the emergency switch or the enabling switch properly, the user may still be hit or severely clamped down upon by the robot. A robot having a safety rated PFL function can stop before causing non-acceptable risk of injury, even when it hits or clamps onto the user.

Joint current or joint torque sensors may perform PFL and hand guidance. However, the speed of the robot when performing PFL is significantly limited by the low sensitive and inaccuracy of the associated joint current modeling, which relates to the reduction gear of the joint. The speed of the robot can also be limited by the maximum allowable torque of a joint torque sensor. In addition, both types of sensors require precise modeling of the dynamics of the robot, which can be overly burdensome or expensive. In most cases, due to risk assessment, users still need to use an enabling switch and emergency stop button at the same time while they are hand guiding a collaborative robot, because most collaborative robots cannot reach an efficient speed in hand guide mode while keeping PFL at a proper level as indicated by safety regulations.

Other than joint-based sensing solutions, mounting an enabling switch to the tool end of a robot to perform hand guidance is not intuitive because the direction of the pushing force applied to the enabling device is often different from the hand guidance direction. Other solutions like mounting a force and torque sensor in the tool end to perform hand guidance only solves the tool-end cartesian hand guidance, while there is also a need for hand guidance through manipulating the body of the robot (e.g., as a joint-based hand guidance). Solutions like mounting a safety skin or cover on a robot body and using it to manipulate the robot may still require an emergency stop button and enabling switch to reduce risk, because of the lack of integration of hand guidance and PFL.

Integration of hand guidance and PFL has another remaining problem. When the user performs hand guidance, if the force exceeds a preset limit, the robot stops. The hand guidance force is never easily regulated at a certain level that does not trigger the stopping of the robot, especially when the user is focused on dragging the robot to a desired position or adjusting the pose of the robot. This results in frequent false-triggering the force/torque limit of the PFL, which lowers the efficiency of such hand guidance. While visual indications or vibrations may help to warn the user, the user still needs to handle the force applied carefully to prevent a false-triggering. Therefore, it may be desirable to be able to provide improved hand guidance systems for robots to integrate with PFL and to provide efficient hand guide functions.

FIG. 1 shows an overview of a robot system 10. As shown in FIG. 1, robot system 10 may include robot 1. Robot 1 may include a controller 4, a user interface/switch 5, and multiple movable members 2 (sometimes referred to herein as movable parts 2, movable robot body members 2, robot body members 2, movable members 2, or body linkages 2 of robot 1) such as body links 101, 102, and 103. Motion of body links 101, 102, and 103 may be actuated by actuators 11. Some or all of movable members 2 may be covered by sensor modules 3 (sometimes referred to herein as sensor structures 3 or sensors 3). In other words, sensor modules 3 may be mounted to one or more of body links 101-103. Sensors 3 may sense the distance between the sensor(s) and a user 20, the touch of user 20, or a force applied to the sensor(s) by user 20 (e.g., the pressing of user 20 against the sensor(s)). Controller 4 may include a safety module 41 and a motion control module 42. Sensor modules 3, safety module 41, and motion control module 42 may include one or more processors to process sensing signals, safety logics or motion control. The one or more processors may be one or more central processing units (CPUs), one or more digital signal processors (DSPs), one or more microcontroller units (MCUs), one or more application specific integrated circuits (ASICs), and/or one or more field programmable gate arrays (FPGAs).

Figure 2:
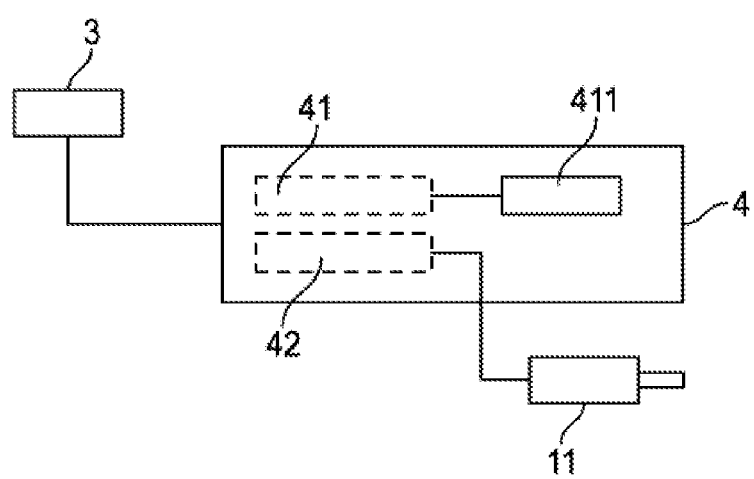
FIG. 2 is a schematic diagram of an illustrative robot system in accordance with some embodiments.

FIG. 2 shows a schematic architecture diagram of robot system 10. As shown in FIG. 2, sensor module 3 may be coupled to controller 4. Sensor module 3 may convey analog, digital, or communication signals with safety module 41 and motion control module 42, which deliver control signals to robot 1. Motion control module 42 may be configured to process signals received from sensor module 3, may calculate the kinematics of the robot 1, and/or may control actuators 11 to perform motions (e.g., cartesian space motions or joint space motions). Safety module 41 may process signals received from sensor module 3, may make decisions for safety actions, and may be coupled to a safety execution structure 411 that executes a safety stop of robot 1. The safety execution structure 411 may, for example, include circuitry (e.g., switches) that cuts power provided to actuators 11 (Cat. 0 stop in IEC60204-1 or STO defined in IEC61800-5-2), that cuts the power after instructing motion control module 42 to decrease the speed of movable members 2 of robot 1 (Cat. 1 stop in IEC60204-1 or SS1 in IEC61800-5-2), or that monitors a standstill state of movable member 2 of robot 1 after instructing motion control module 42 to decrease the speed of movable members 2 of robot 1, and if the standstill state is violated, that cuts the power provided to actuators 11 (Cat. 2 stop in IEC60204-1 or SS2 in IEC61800-5-2).

In this overview of the system, sensor module 3 may generate sensor signals (sometimes referred to herein as control signals, sensor output signals, sensor output, or sensor data). The sensor signals may be indicative of touch or force applied to sensor module 3 and/or of proximity between the sensor module and an external object such as the user. The sensor signals may include a trigger of a hand guidance motion associated with a hand guidance instruction performed by user 20 in a hand guidance mode of robot 1. Additionally or alternatively, the sensor signals may identify a touch position of an instruction force applied to sensor module 3, may include an identification (ID) number or other identifying information of sensor module 3 (e.g., identification information that identifies or is associated with a known mounting location of the sensor module 3 on robot 1), and/or may include or identify a coordinate of where on sensor module 3 user 20 is touching (sometimes referred to herein as a touched position). Sensor module 3 may transmit the generated sensor signals to safety module 41 and motion control module 42 for use in subsequent processing.

Motion control module 42 may use the received sensor signals to generate control the motion of the robot 1 (e.g., to follow an instruction of touching, pressing, or proximity performed by user 20 in performing hand guidance and as identified by the sensor signals). The hand guidance motion may be a position control of the cartesian space or joint space motion of the robot, or a "Zero gravity" compliance control that allows robot 1 to be easily moved by an external force when the sensor signal from sensor module 3 solely indicates an enabling signal. If desired, the sensor signal generated by sensor module 3 may also include a detected magnitude of the instruction force, a proximal distance, or a proximal speed that the motion control module 42 may utilize to adjust the speed or the compliance of the hand guidance motion (e.g. a larger instruction force, a shorter proximal distance, or a higher proximal speed may indicate a faster guided motion speed).

Safety module 41 may use the sensor signals generated by sensor module 3 to perform PFL. For example, when a certain level of force or proximal distance is detected by sensor module 3, safety module 41 may control safety execution structure 411 to safely stop the robot.

In addition, safety module 41 may use the sensor signals to keep robot 1 in a safety stop status while the hand guidance instruction force, proximal distance, or contact is not detected. Combined with the PFL function, sensor module 3 and safety module 41 may perform a safety function like a 3-position enabling switch in the perspective of functional safety and machinery safety by forming an OFF-ON-OFF manipulation. This kind of design may ensure safety when the robot 1 loses control. User 20 may, for example, either fully release sensor module 3 or fully press sensor module 3 to stop the robot 1 safely. It may also ensure that in the hand guidance mode, without the user's triggering, robot 1 will be in a standstill state safely. An example of the actions of the motion control module 42 and the safety module 41 is shown in Table 1 below:

TABLE 1

|  | Signal: PFL not reached | Signal: PFL reached |
|---|---|---|
| Signal: No Contact | Motion control module: No hand guide motion Safety module: Safety Stop | Motion control module: No hand guide motion Safety module: Safety Stop *This may only happen when there is a fault in the system |
| Signal: Contacted | Motion control module: hand guide motion is triggered, motion direction is generated by considering the pressing position on the robot, and the motion velocity or the compliance is proportional to the contact force Safety module: Cancel the safety stop | Motion control module: No hand guide motion Safety module: Safety Stop |

The sensor signals generated by sensor module 3 may be a trigger signal (High/Low) of a result of processing of one or more processors in sensor module 3, or a signal with a magnitude, and then processed by safety module 41 and/or motion control module 42.

The systems and methods described herein may replace functions of the enabling switch and the emergency switch during hand guidance, which brings improved efficiency for the hand guidance of a robot as users do not need to hold additional buttons or switches in their hands, hence both hands can be used on hand guiding of the robot. The systems and methods described herein also exhibits improved safety performance by having a more direct risk reduction design than the enabling switch or emergency switch that relies more on the user's reaction to trigger a safety stop.

An important factor in the safety performance of a machine is the time between a fault happening (e.g., the loss of control that violates a user's instructions) and the activation of the safety protection system (e.g., the safety stop function of a robot). This time includes reaction time of the user and the reaction time of the machine. The process can be broken down to the time for user to recognize that there is a fault, the time for the user to consider the action that he/she need to take, the time for user to act to trigger the safety system (like pressing the emergency stop or to fully press/fully release the enabling switch), and then the reaction time inside the machine to process the emergency signal in the safety system to order a safety stop.

Before the user triggers the safety system, the machine may still be in a loss of control status, which brings additional safety risk. Even after triggering the safety stop, the robot needs a stopping time and distance to stop due to inertia. A longer user reaction time brings increased hazards and a worse safety performance because within this period the robot is not yet stopped and is still moving with the original speed in an errant manner.

Figure 3:
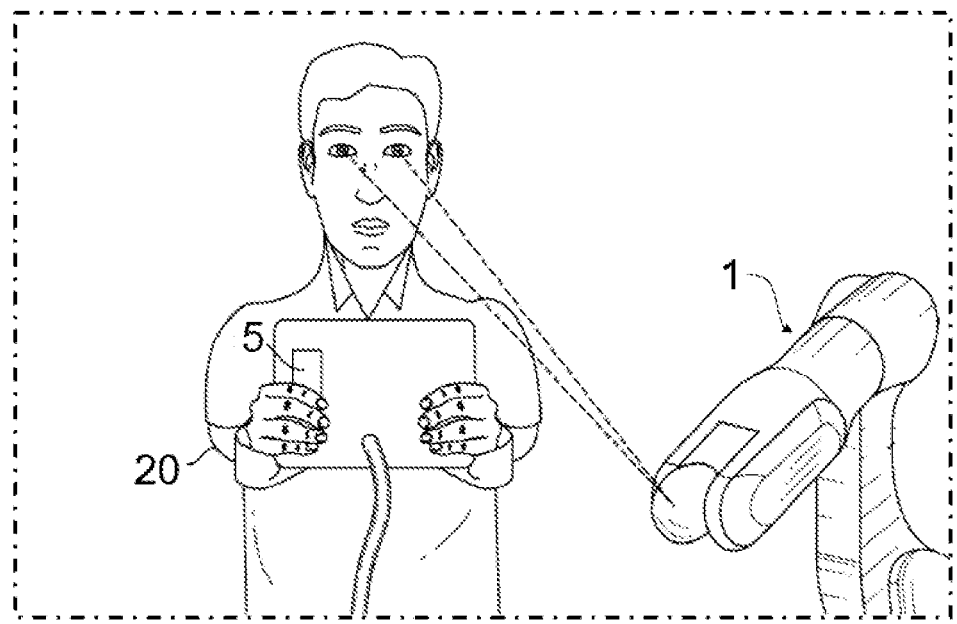
FIG. 3 is a diagram illustrating how a user may teach a robot using a user interface having an enabling switch in accordance with some embodiments.
Figure 4:
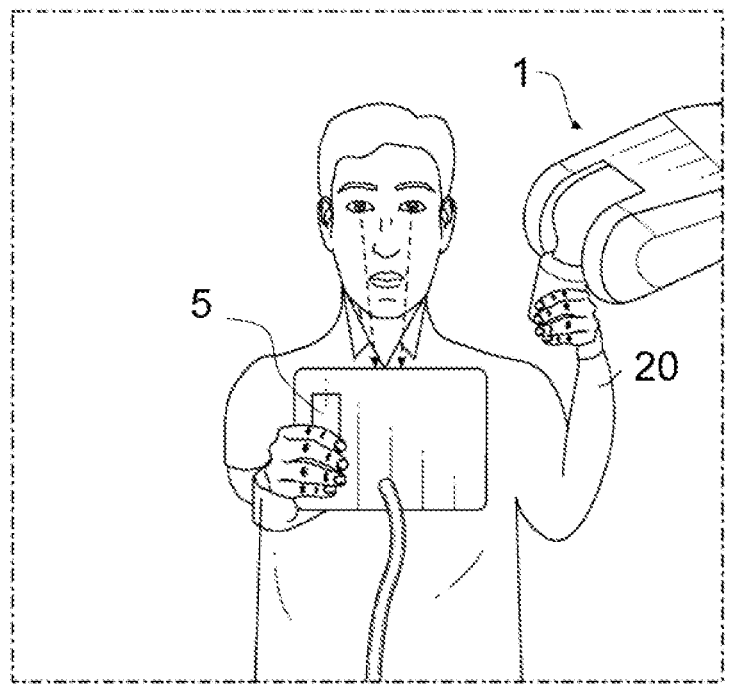
FIG. 4 is a diagram illustrating how a user may manually teach a robot in a hand-guide mode with an enabling switch on a teaching pendant in accordance with some embodiments.
Figure 5:
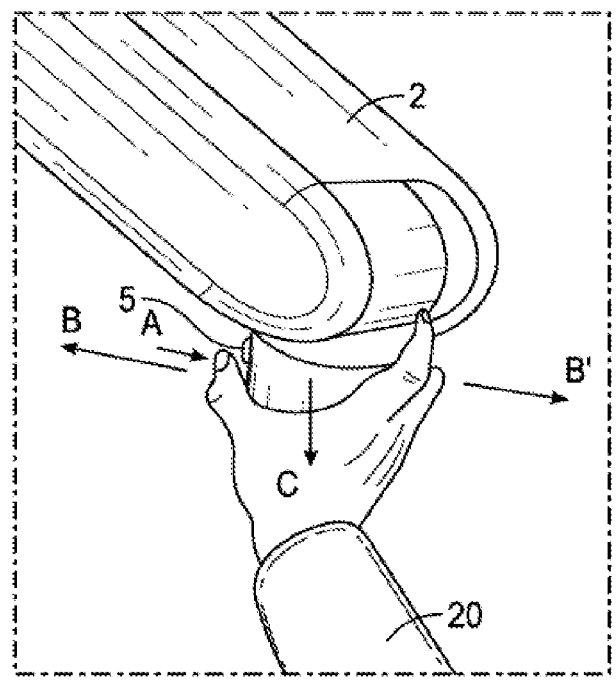
FIG. 5 is a diagram illustrating how a user may manually teach a robot in a hand-guide mode through holding a tool end of the robot in accordance with some embodiments.

FIGS. 3-5 show some solutions of safety reduction in manipulating a robot: jogging a robot (FIG. 3) with a teaching pendant/tablet having an enabling switch, hand guiding a robot with a teaching pendant/tablet having an enabling switch (FIG. 4) and hand guiding a robot with a tool end enabling switch (FIG. 5).

Referring to FIG. 3, during jogging of the robot, the user needs to observe the movement of the robot with their eyes, recognizing if the robot moves according to the jog command that user gives by continuously pressing ("hold to run") the physical or software buttons or switches, which usually do not belong to a safety rated device of software, on the teaching pendant (in front of the user, not shown in the figure). At the same time, the user needs to hold a safety rated enabling device 5 at a middle position continuously. Once the robot performs an unexpected action, the user needs to realize that the unexpected action has occurred and then fully press or fully release the enabling switch 5 in hand to stop the robot safely.

FIG. 4 shows a solution in which robot 1 includes a hand guide function that requires the user to hold the tool end of robot 1 to guide robot 1. When performing such a hand guiding manipulation, a similar effort is required—a hold-to-run button needs to be held, and a safety rated enabling device 5 needs to be pressed in its middle position continuously.

FIG. 5 shows a solution in which the hold-to-run button and safety rated enabling device are mounted to the tool end of robot 1. If desired, the function of the hold-to-run button and safety rated enabling device may be combined and performed by a safety rated 3-position enabling device 5. FIG. 5 shows a scenario wherein the user holds the tool end by hand and concurrently presses the enabling switch 5 with their thumb (e.g., in a pressing direction A) to hand guide the robot, while the robot may detect the guiding force with built-in sensors such as tool end force/torque sensor, or joint torque sensors. When a robot performs unexpected motions, the instinctive reaction of the user may be to hold the robot tool end to stop the robot. If the robot swings away along direction B, it is easiest for the user to react because the direction A that user pressing the enabling device 5 is just the same with the direction of blocking the running direction of the robot. But in the case where the robot swings errantly along direction B', it is more difficult to instinctively press or release the enabling switch, and the runaway direction C is the most difficult case for user to instinctively press the enabling device 5.

Figure 6:
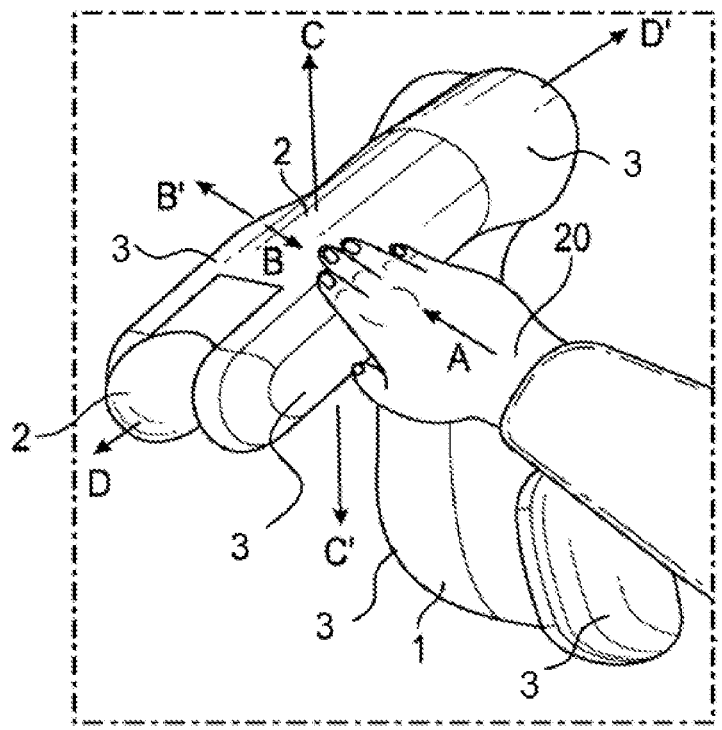
FIG. 6 is a diagram illustrating how a user may manually teach a robot in a hand-guide mode through pressing a movable member of the robot in accordance with some embodiments.

FIG. 6 shows an implementation that may allow a better reaction time and a more intuitive, no-need-for-training arrangement relative to the arrangements of FIGS. 3-5. As shown in FIG. 6, robot 1 may be covered with multiple sensor modules 3 on the surfaces of its body linkages 2. The user may perform the hand guiding and safety functions shown and described in FIGS. 1 and 2 and in table 1. User 20 may guide robot 1 by pressing one or more sensor module 3 in a corresponding direction A. If a fault occurs in robot 1 that causes the robot to swing errantly away along direction B or C, the user instinctively blocks the robot, and the blocking force may trigger PFL provided by sensor module 3 and safety module 41 which serve to stop the robot safely. This action may equate to the full pressing of an enabling switch that enables the robot's motion. In the case where after a fault occurs, the robot swings errantly in direction B' and C', the robot leaves the user which also trigger a stop (e.g., according to the logics presented in table 1), equating to releasing the enabling switch. In case of D and D', although the runaway direction does not directly cause pressing of release, the user still has a chance to react to stop the robot by simply leaving his/her hand in place, grasping the robot (and so grasping the sensor module 3), or to press deeper on the sensor module 3 to stop the robot.

If the user is not pushing the robot as shown in FIG. 6, and is grasping/pulling the robot, such as in the case of direction B'/C'/D/D', the safety design also works well because the instinctive reaction to grasp and hold the robot, if it is moving errantly, will also trigger the PFL.

Even if the user does not leave their hand on the robot or press deeper to stop the robot and still holds the sensor module 3 at an average level of force continuously (although this is unlikely to happen) which still enables the robot, causing the robot to bump into objects in the environment or part of the user, the PFL will still be triggered in such contact as long as the robot is covered with the sensor modules 3.

The implementations of FIGS. 1-2 and table 1 integrate the enabling function into the entire body of the robot using sensor modules 3, so that the user does not need to put one or more fingers or hands on an additional enabling device and can use all their fingers or hands as needed (e.g., to manually instruct or teach the robot).

Sensor module 3 may include any desired sensor structures for sensing force, proximity, and/or touch of the user along some or all of robot 1. Sensor module 3 may include a sensor 31 mounted to a sensor structure such as resilient member 32. Resilient member 32 may, for example, be a rigid or deformable member, support, substrate, layer, or support structure for sensor 31. Resilient member 32 may be formed from foam, polymer, plastic, rubber, or other materials, for example. Resilient member 32 may couple sensor 31 to the underlying movable part 2 of robot 1. Sensor 31 may sometimes be referred to herein as sensor layer 31, active layer 31, sensing layer 31, or the sensing/active portion 31 of sensor module 3.

FIGS. 7A and 7B show one example in which sensor 31 in sensor module 3 is a force sensor. The force sensor may sense and output a magnitude of contact force to its surface (e.g., as applied by user 20). The force sensor may be, for example, a resistive force or contact sensor (e.g., a sensor that senses force or contact via minute or large depressions or forces applied to the sensor). Sensor module 3 may be disposed (layered) onto the outer surface of one of the movable parts 2 of robot 1. Sensor 31 (e.g., a force sensor) may be located on/at the outer surface 36 of sensor module 3 (e.g., the side of sensor module 3 opposite movable part 2). This kind of arrangement may maximize the sensitivity of the force sensing sensor that it contacts and detects the external object first so it will have a most clear contact signal for hand guidance. Sensor module 3 may further include one or more processors 34 (e.g., control circuitry), which can include an MCU and/or other circuitry coupled to sensor 31. Sensor 31 may generate a sensor signal in response to a force applied to sensor module 3 (e.g., by user 20). One or more processors 34 may process the sensor signal and/or may provide the sensor signal to motion control module 42 and safety module 41 in controller 4 of robot 1.

FIG. 7A shown a sequence of user's hand approaching sensor module 3. FIG. 7B illustrates the corresponding sensing signal 35 produced by sensor 31. In the first (leftmost) portion of FIG. 7A, the user's hand is not yet touching the sensor 31, so there is no force detected, and the sensor module 3 may not output a hand guidance instruction signal to controller 4. Then, in the second portion of FIG. 7A, user 20 contacts sensor 31, the contact force may be sensed by sensor module 3, and motion control module 42 may be configured not to initial (initialize) a hand guidance motion. Until the force reaches a set level of magnitude (e.g., threshold 51 in FIG. 7B), as a first compression status in FIG. 7A, the motion control module 42 may start to perform the hand guidance motion. This may eliminate the false triggering of the hand guidance motion, such as in the case when external wirings of the robot are dropped on or leaned on the sensor module 3. Then, following the increasing of the compression, the user's hand may finally reach a status shown in the third portion of FIG. 7A: the full compression of the resilient member 32, where the force that sensor 31 senses reaches a threshold 53 in FIG. 7B. This is a steady supported status for the hand of the user 20, wherein motion control module 42 may maintain robot 1 in a hand guidance motion. Then, if there is a larger force than threshold 53, for example, a set threshold 52 in FIG. 7B (e.g., a force that falls outside the range between thresholds 53 and 52), sensor module 3 may send out a safety signal to safety module 41, and the robot 1 may be stopped safely by safety module 41. The force sensed by sensor module 3 reaching threshold 52 may correspond to a status in which resilient member 32 is fully compressed, and with additional force applied on the sensor module 3, such as when the user presses harder.

When robot 1 is in a hand guidance mode and user 20 does not press sensor module 3 of robot 1, the hand guidance may not be triggered. Then with a proper level of instruction force, robot 1 may initialize the hand guiding. During hand guidance, user 20 may press sensor module 3 with a range of instruction force, and finally can feel a physical limitation or a blocking, so user 20 can keep a relatively constant instruction force applied that is easy to maintain while not triggering a safety stop.

When robot 1 loses control, there may be three main scenarios. In the first scenario, user 20 may recognize that robot 1 is not following their instruction, so the user either tries to hold robot 1 to stop it or is shocked and releases contact with robot 1. In both cases robot 1 will stop safely. In the second scenario, robot 1 may errantly move toward user 20, and then robot 1 will also be stopped safely because the set threshold 52 is finally reached and PFL triggers the stop of robot 1 safely. In the third scenario, although less likely, user 20 may still maintain a proper instruction/enabling force (e.g., according to threshold 53) to sensor module 3 and robot 1 may not be safely stopped and may still be enabled, but when robot 1 finally bumps into an external object like the environment or user 20, threshold 52 is reached and PFL triggers robot 1 to stop safely.

The resilient member 32 in this case may also act as a buffer of PFL bumping processes that detect a collision and trigger the safety stop before the movable parts 2 of the robot 1 bump into the environment or user 20. There is a reaction time of sensor module 3 that senses and processes the sensor signal produced by sensor 31, deciding and triggering the stop, while the signal to trigger the stop may need further processing in safety module 41. During this time period, robot 1 may not yet stop and move with the original speed, or, under a fault situation, an unexpected speed in a loss of control status. In a case wherein robot 1 has the PFL function but does not have resilient member 32, the rigid body of the robot 1 (e.g., the movable parts 2) may hit user 20 first then triggering PFL to stop, and the final impact force may be large because the impact force is generated once the rigid body of robot 1 hits user 20. Within the sensor's reaction time, robot 1 may still move at the original speed, so the impact force is much higher. Putting soft covers on robot 1 may absorb some of the shock and decrease the harm to the user, but a prior triggering of stop before the rigid body of the robot 1 hits the user will significantly lower the maximum impact force.

Figure 8A:
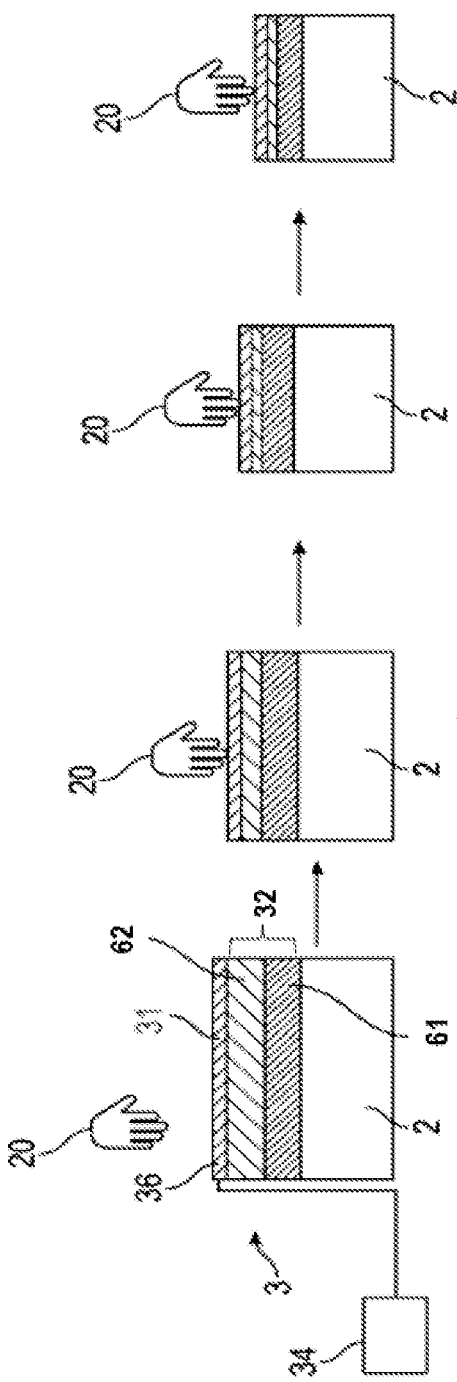
FIG. 8A is a cross-sectional side view of an illustrative sensor module including a force sensing sensor mounted to a resilient member that includes an inner resilient layer and an outer resilient layer in accordance with some embodiments.
Figure 8B:
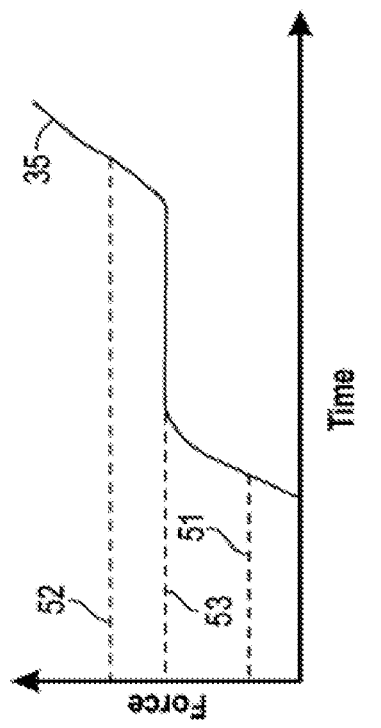
FIG. 8B is a chart of an illustrative sensing signal produced by a sensor module of the type shown in FIG. 8A, illustrating thresholds of the sensing signal in accordance with some embodiments.

FIGS. 8A and 8B show another example in which resilient member 32 includes multiple sub-layers such as a first resilient layer 62 and a second resilient layer 61 (e.g., resilient member 32 may sometimes be referred to herein as resilient layer 32 whereas layers 61 and 62 form sub-layers of resilient layer 32). Second resilient layer 61 may be layered on movable part 2 of robot 1, first resilient layer 62 may be layered on second resilient layer 61, and sensor 31 may be layered on first resilient layer 62 (e.g., resilient layer 62 may be interposed between sensor 31 and resilient layer 61). First resilient layer 62 (sometimes referred to herein as layer 62 or sub-layer 62) and second resilient layer 61 (sometimes referred to herein as layer 61 or sub-layer 61) may have different rigidities. This may serve to create a clear physical support for the user to recognize and to consciously apply a proper instruction force on the sensor 31. In the case shown in FIG. 8A, the rigidity of resilient layer 61 may be higher than the rigidity of resilient layer 62 (e.g., resilient layer 61 is more rigid than resilient layer 62). Alternatively, resilient layer 61 may be less rigid than resilient layer 62. If a harder (more rigid) resilient layer is arranged on top of a softer (less rigid) resilient layer, the function may be similar, because when the layers are pressed by an external force, the layer with the lower rigidity will be compressed first.

FIG. 8B shows the corresponding sensor signal 35 that may be generated (sensed) by sensor 31. As shown in FIG. 8B, first, when user 20 is not yet touching the sensor module 3, no force is detected. Then, user 20 touches the sensor module 3 and starts to compress resilient layer 62, but only until the resilient layer 62 is fully compressed (e.g., as shown in the third portion of FIG. 8A), causing the sensing signal to reach a set (predetermined) threshold 53, which causes motion control module 42 to start to put the robot 1 in a hand guidance motion. If user 20 continuously presses deeper, the user may start to compress the underlying resilient layer 61 and may feel a harder physical resistance, allowing the user to know they can keep the instruction force at a proper level. The trigger of the safety stop (e.g., threshold 52 in FIG. 8B) is preferably set in a distance that under a certain depth that the resilient layer 61 is compressed, to have a buffer for avoiding false triggering to the safety stop.

Figure 9A:
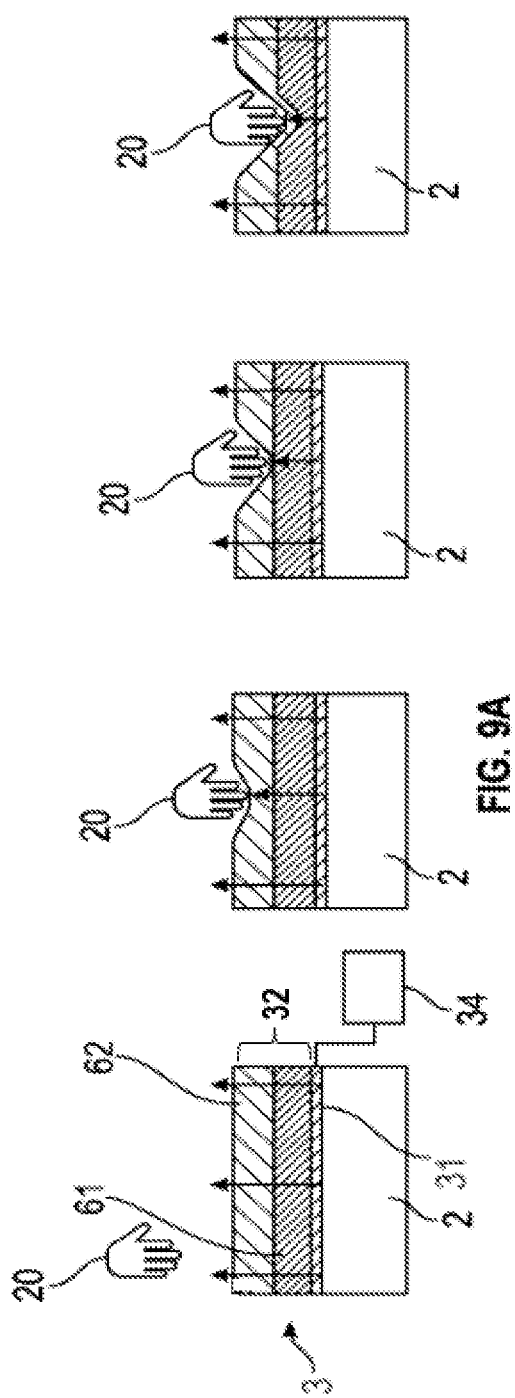
FIG. 9A is a cross-sectional side view of an illustrative sensor module including a proximity sensor and having a resilient layer with an inner resilient layer and an outer resilient layer in accordance with some embodiments.
Figure 9B:
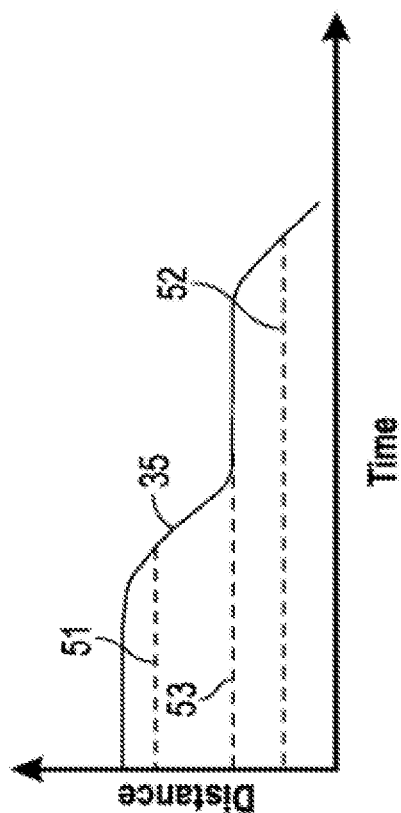
FIG. 9B is a chart of an illustrative sensing signal produced by a sensor module of the type shown in FIG. 9A, illustrating thresholds of the sensing signal in accordance with some embodiments.

FIGS. 9A and 9B show an example in which sensor 31 is a proximity sensor. The proximity sensor may be, for example, a capacitive proximity sensor that detects when any approaching conductor, like a human hand or the metal parts in the environment, changes a capacitance detected by the sensor. In this example, sensor 31 (e.g., a proximity sensor) may be arranged under the resilient layer 32 (e.g., between resilient layer 32 and movable member 2). The resilient layer's material may be selected so as not to impede the sensing of capacitance through the resilient layer by the underlying sensor 31. For example, resilient member 32 may include an insulated material that allows the capacitive proximity sensing to pass through the resilient member 32 and to still allow sensor 31 to detect external conductive objects approaching sensor module 3. If desired, resilient member 32 of FIG. 8A may include a resilient layer 62 and a resilient layer 61 having different rigidities.

Referring to FIG. 9B, the sensing signal 35 is indicative of the distance sensed by sensor 31 between sensor 31 and an external object (e.g., user 20). In the beginning the sensed distance to user 20 is larger than the thickness of the resilient member 32. Then, if desired, only after the user's hand presses the resilient member 32 and compresses a certain set depth of the resilient layer 62 (second portion of FIG. 9A), motion control module 42 starts to put the robot 1 into hand guided motion. The steady supported status is shown in the third portion of FIG. 9A and the corresponding set threshold 53 to let motion control module 42 to initialize hand guide motion of robot 1 is shown in FIG. 9B. The safety stop threshold 52 in FIG. 9B corresponds to the fourth portion of FIG. 9A and may function similar to as shown in FIG. 8B.

In the example shown in FIGS. 9A and 9B, if desired, the distance threshold 51 to let motion control module 42 initial a hand guide motion may be set at a distance corresponding to user 20 being kept at a certain distance from the outer surface of resilient member 32, whereas the distance threshold 53 may be set at a distance corresponding to user 20 touching the surface resilient member 32, which works as a physical steady status of continuously enabling the hand guide. Furthermore, if desired, the distance threshold 53 may also be set at a distance corresponding to user 20 being kept a certain distance to the outer surface of resilient member 32 but is shorter than the case of threshold 51. In such a case, the resilient member may still absorb the impact force to the user when an error is occurred, and robot loses control.

FIGS. 10A and 10B show an alternative example in which sensor 31 is a proximity sensor and in which a cover layer such as covering layer 33 is layered over sensor module 3 (e.g., at/on the outer surface 36 of sensor module 3). In this example, sensor 31 may detect the distance between sensor 31 and covering layer 33 instead of detecting the distance between sensor 31 and the external object. As user 20 presses on covering layer 33 and covering layer 33 is deformed towards sensor 31, sensor 31 may thereby detect the presence of user 20 and the force applied by user 20 via the corresponding deformation of resilient layer 32 as sensed via the distance between covering layer 33 and sensor 31. Adding the covering layer 33 may bring advantages for some applications such as when sensor 31 is a capacitive proximity sensor and the external object to be detected is not conductive. At the same time in some industrial applications, robot 1 may be required to be anti-static, which means the surface of sensor module 3 cannot be an insulator which will gather static electricity. Another advantage is that the covering layer 33 can be an enclosure that protects the sensor module 3, particularly when installed in a severe industrial environment, which may not be friendly to the resilient member 32 (e.g., when filled with oil or oil gas). The example of FIGS. 8-10 in which resilient layer 61 is layered on resilient layer 62 is merely illustrative. If desired, sensor layer 31 may be interposed between resilient layer 61 and resilient layer 62 in any of these examples (e.g., resilient layer 62 or an additional cover layer may form the exterior surface of sensor module 3 and/or resilient layer 61 may be layered onto or in contact with movable part 2).

FIGS. 11A and 11B shows an example in which sensor module 3 includes a contact sensor 37 in its outermost layer, a single-layer resilient member 32, and an where the underlying sensor 31 is a proximity sensor. The material or design of the resilient member 32 may be configured to allow proximity sensing to pass through the resilient layer. The contact sensor 37 may detect whether or not it is being touched by a user or external object. Contact sensor 37 may, for example, include resistive or capacitive touch screens or a medium propagating wave sensor. A medium propagating wave sensor may generate and propagate ultrasonic waves through the surface of contact sensor 37 and may measure changes of the wave form when an external body touches or deforms the surface of contact sensor 37. Contact sensor 37 may detect if it is touched or not and may generate a corresponding sensor signal for one or more processors 34 that is used to trigger the hand guidance motion. When contact sensor 37 is touched, the resilient member 32 may only have a very small compression (amount of depression) or no compression (amount of depression), and this may be set as the threshold 51 for motion control module 42 to initialize a hand guide motion. The sensor signal indicating whether or not contact sensor 37 is being touched or not may also be sent to the safety module 41 with a safety transmission method like a safety 10 or a safety rated communication, to put the robot 1 in a safety stop when it is not being touched. FIG. 11B shows the signal that sensor 31 may sense during the hand guiding process shown in FIG. 11A. Sensor 31 may detect a deeper compression (depression) if user 20 continues to apply a compressive force after touching contact sensor 37. Then, within a range of compression (depression) to the resilient member 32, the user can still manipulate the hand guidance of the robot 1, as shown in FIG. 11B (e.g., between threshold 51 and 52). When a set compression threshold 52 is reached, the safety module 41 may stop the robot 1 safely. The advantage of this arrangement is that it allows for a lighter contact force to trigger and manipulate the hand guidance, but still provides a steady physical contact for user to properly perform a continuously enabling, for example, continuously touching the surface of sensor 37.

For the embodiments disclosed in FIG. 10A-11B, sensor 31 may include an optical sensor, where resilient member 32 is non-opaque (transparent or translucent). The optical sensor can be an infrared sensor that emits infrared light and receives reflection infrared light from the covering layer 33 (e.g., in FIG. 10A) or contact sensor 37 (e.g., in FIG. 11A), and then outputs a sensor signal identifying proximity distance. Another kind of optical sensor 68 is a micro camera that monitors a pattern (not shown) marked in the inner side of the layer 33d or 33e and calculates the compressed distance or the amount of deformation of the resilient member 32.

FIGS. 12A and 12B show an example in which sensor module 3 includes a pressure sensor 71 that detects a change in air pressure inside of resilient member 32, which may include a deformable air chamber 70. A relationship between the air pressure and the compression (depression) of the deformable air chamber 70 may be predetermined. The resilient member 32 may include a deformable plate 72 arranged inside the air chamber 70 with holes so the air between the two spaces separated by the deformable plate is connected. The deformable plate 72, as shown in the second portion of FIG. 12A, provides a physical interface for the steady supported status for indicating the maximum hand guidance instruction force. The sensing signal 35 in such an example is shown in FIG. 12B, and thresholds 51, 52, and 53 may function similar to the former embodiments for the hand guide and PFL of a robot.

Figure 13:
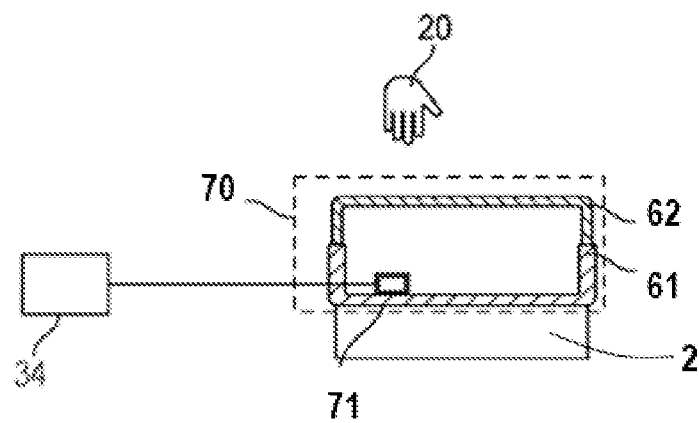
FIG. 13 is a cross-sectional side view of an illustrative sensor module including a deformable air chamber constructed with two deformable materials having different rigidities and an air pressure sensor in accordance with some embodiments.

As shown in the example of FIG. 13, instead of including deformable plate 72 in FIG. 11A, deformable air chamber 70 may be formed from resilient layers 61 and 62 having different rigidities. For example, resilient layer 62 may form an upper portion or wall of deformable air chamber 70, resilient layer 61 may form a lower portion or wall of deformable air chamber 70, and resilient layers 62 and 61 may collectively surround and enclose the air chamber. The differing rigidities may provide physical support for user to continue enabling during a hand guide process.

If desired, the example shown in FIG. 11A may include two layers of deformable air chambers one on top of another, and each having a pressure sensor to detect the deformation of them when user compress them. The rigidity of one air chamber may be higher than another one, so as to provide a physical support to let user apply a proper enabling force continuously during a hand guide motion.

Figure 14:
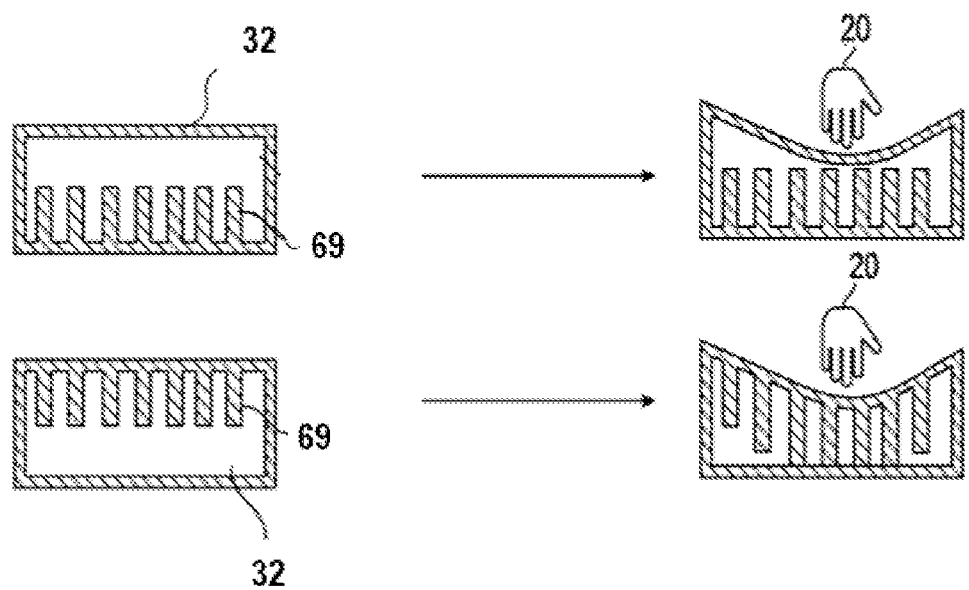
FIG. 14 is a cross-sectional side view of an illustrative resilient member having denser projections within the resilient member in accordance with some embodiments.

FIG. 14 shows examples in which resilient member 32 includes deformable pillars or projections 69 mounted on a top or a bottom of the internal space (air chamber) of resilient member 32. Projections 69 may form a steady compression recognition for the physical support for the user to apply proper enabling force during a hand guide process (e.g., the user may feel the presence of projections 69 when the user has pressed a certain amount, allowing the user to know how much force to continue to apply during the hand guide process without ending the hand guide process or triggering a safety stop). This example may be used wherein the sensor module 3 detects the deformation of resilient member 32 through different kind of sensing technology, for example proximity sensing, force sensing, pressure sensing, as described above.

Figure 15:
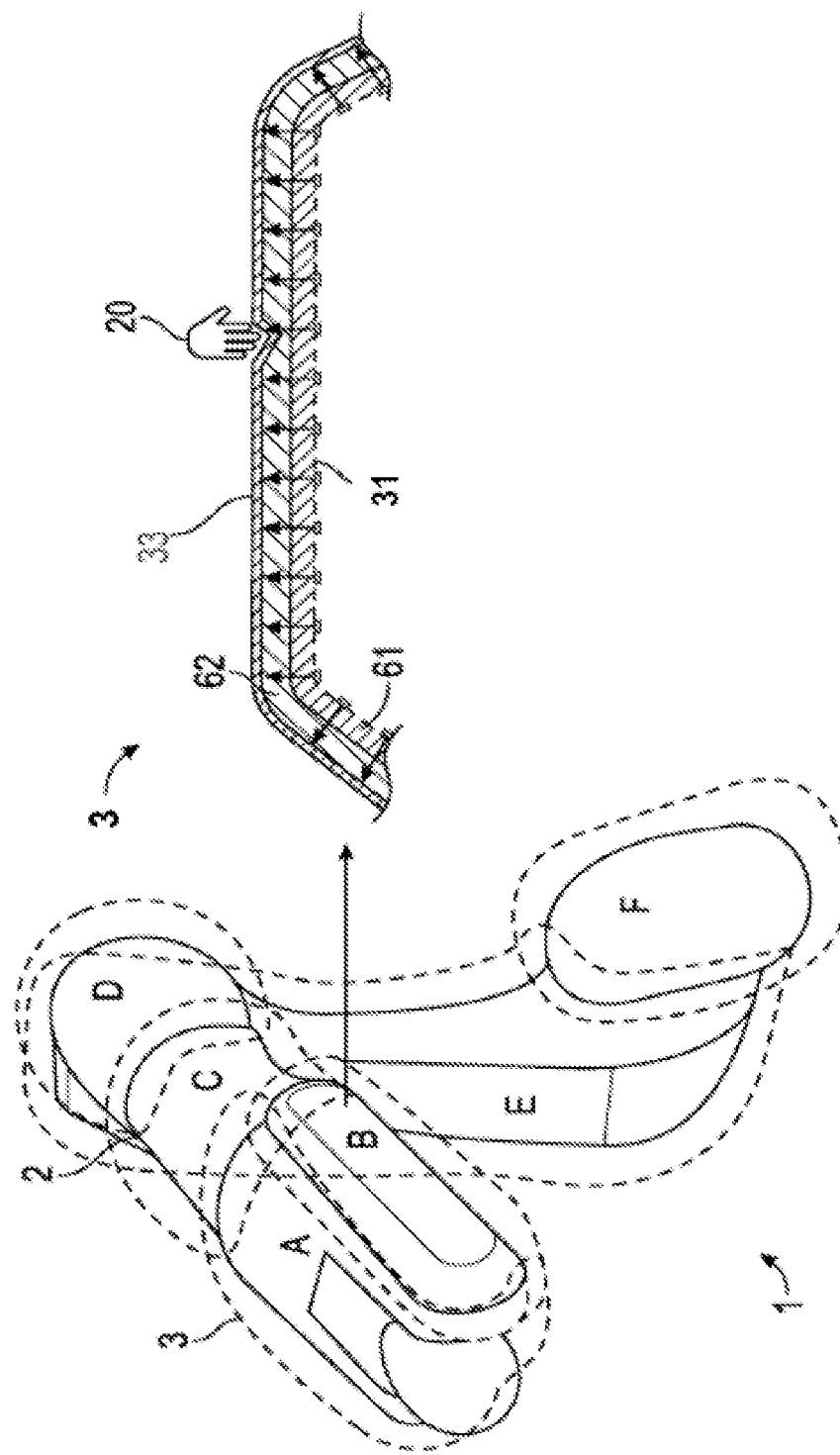
FIG. 15 is a diagram of an illustrative sensor module mounted to a movable member of a robot and including a proximity sensor in accordance with some embodiments.

FIG. 15 shows an example of robot 1 having multiple sensor modules 3. Sensor modules 3 may be disposed on robot 1 in a manner that covers multiple movable members 2 of robot 1, such as the movable members indicated by letters A, B, C, D, E, and F in FIG. 15. Sensor module 3 may provide PFL safety function and enabling hand-guiding at the same time. The cross-sectional side view in FIG. 15 shows an example structure of sensor module 3. In this example, sensor module 3 includes an array of sensors 31 such as proximity sensors, which may allow sensor module 3 to detect the location on sensor module 3 and thus the corresponding movable member where the hand guide instruction is being applied by the user. The sensing signals generated by sensor module 3 may include information identifying this location (e.g., the location of the particular sensor 31 that detected contact/pressing by the user). The information identifying the pressed position then can be used in motion control module 42 to generate the hand guidance motion of the robot corresponding to a contact point of the resilient member 32.

Figure 16:
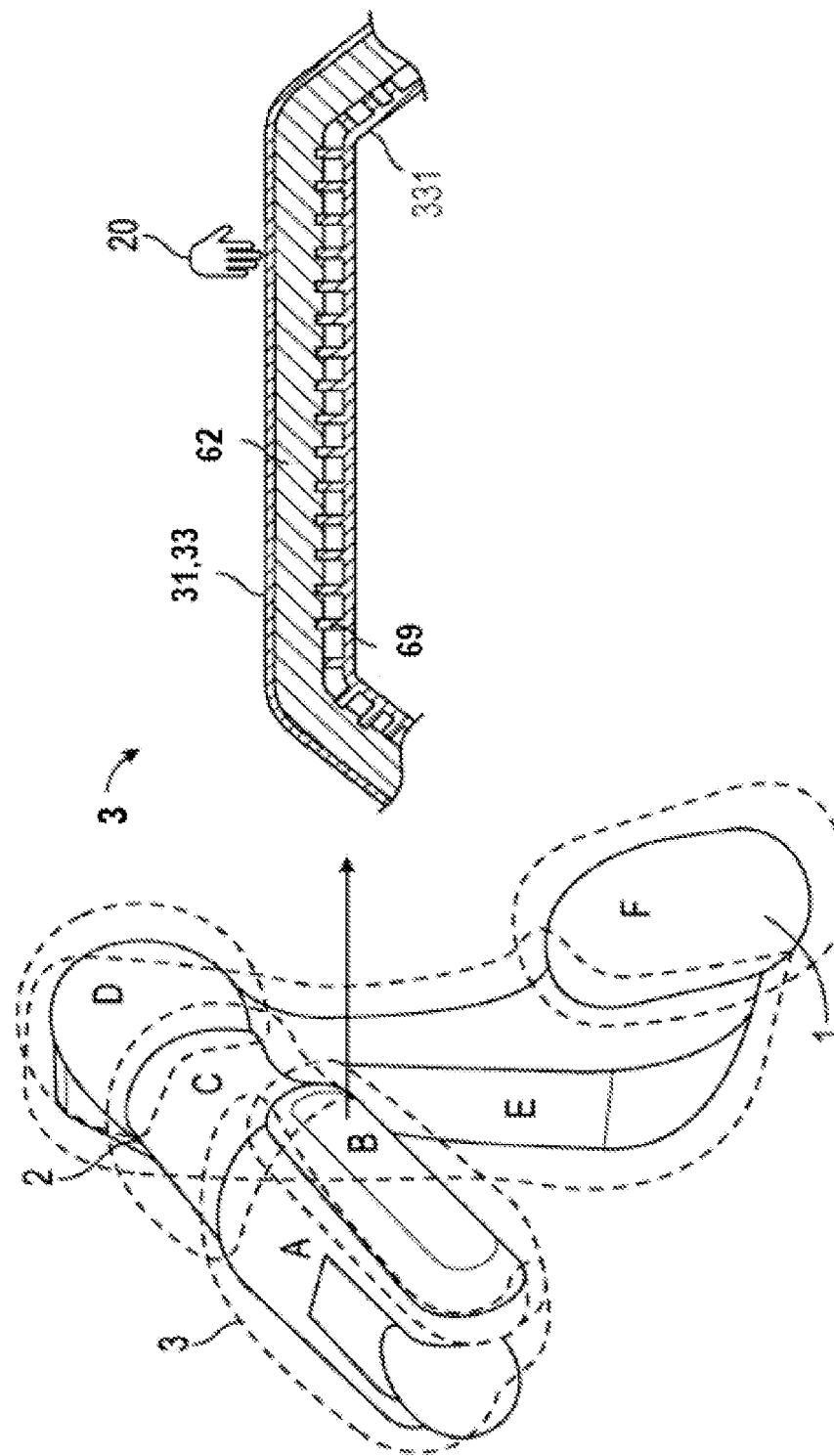
FIG. 16 is diagram of an illustrative sensor module mounted to a movable member of a robot and including a medium propagating wave sensor in accordance with some embodiments.

FIG. 16 shows an example in which sensor 31 is a medium propagating wave contact sensor, which also plays the role of the covering layer 33 of sensor module 3. The covering layer 33 may be a rigid cover and sensor 31 may generate an ultrasonic wave that propagates along the cover. Sensor module 3 may include a resilient layer 32, for example a layer of foam, and deformable pillars or projections 69 on an underlying support structure 331 that couples the sensor module to movable member 2 of the robot 1. When the user 20 presses the covering layer 33, resilient layer 32 is compressed and sensor 31 detects the changing of the waveform of ultrasonic waves propagating on the covering layer 33 and outputs the position of the touch and the magnitude of the touched force. When the user compresses further, the rigid cover 33 will contact the deformable pillars 69 to form a physical recognition of the boundary of a proper hand guide instruction force. This example brings an advantage of having a metal cover in the outermost layer which is more endurable in an industrial environment. In this way, sensor module 3 may form a removable or installable cover or safety cover for movable parts 2 of robot 1. Sensor module 3 may therefore sometimes be referred to herein as safety cover 3, cover 3, or robot safety cover 3.

The position of the touch may be an important information for a robot 1 using a position control to perform hand guide motion. For a robot 1 using a compliance function or a "Zero gravity" mode hand guide function, the contact position may not be required. In this case, sensor module 3 may only work as an enabling switch for hand guide and a PFL safety sensor.

While a particular form of the invention has been illustrated and described, it will be apparent that various modifications can be made without departing from the spirit and scope of the proposed disclosure. For example, various other types of sensors 31 and resilient member 32 may be included. The foregoing embodiments may be implemented individually or in any combination.

What is claimed is:

1. A robot system comprising:
   a robot having a movable part;
   a sensor disposed on the movable part, wherein the sensor has a layer and is configured to generate a sensor signal indicative of depression of the layer relative to the movable part; and
   one or more processors configured to:
      move the robot according to a manual instruction of guiding the robot when there is a first amount of depression of the layer relative to the movable part, and
      stop the robot when there is a second amount of depression of the layer relative to the movable part, the second amount of depression being greater than the first amount of depression.

2. The robot system of claim 1, wherein the sensor comprises a sensor layer interposed between the layer and the moveable part, the sensor layer being configured to generate the sensor signal.

3. The robot system of claim 1, wherein the sensor comprises a first additional layer and a second additional layer, the layer comprises a sensor layer configured to generate the sensor signal, the sensor layer is interposed between the first additional layer and the second additional layer, the first additional layer has a first rigidity, and the second additional layer has a second rigidity that is different from the first rigidity.

4. The robot system of claim 1, wherein the sensor comprises a first additional layer and a second additional layer on the first additional layer, wherein the second additional layer is interposed between the first additional layer and the layer, the first additional layer has a first rigidity, and the second additional layer has a second rigidity that is different from the first rigidity.

5. The robot system of claim 1, wherein the sensor comprises a resilient member and a proximity sensor interposed between the resilient member and the movable part.

6. The robot system of claim 5, wherein the layer comprises a cover layer on the resilient member and forming an outermost surface of the sensor.

7. The robot system of claim 1, wherein the sensor comprises a capacitive proximity sensor.

8. The robot system of claim 1, wherein the sensor comprises a resilient member and an optical sensor interposed between the resilient member and the movable part, the resilient being configured to transmit light generated by the optical sensor.

9. The robot system of claim 1, wherein the sensor comprises an air pressure detection sensor having a deformable air chamber defined at least in part by the layer.

10. The robot system of claim 1, wherein sensor comprises a sensor layer configured to generate the sensor signal and the one or more processors is configured to stop the robot when the sensor signal indicates that an external object has moved to more than a threshold distance from the sensor layer.

11. The robot system of claim 1, wherein:
   the first amount of depression comprises a first non-zero amount of depression,
   the second amount of depression comprises a second non-zero amount of depression,
   the one or more processors are configured to move the robot according to the manual instruction of guiding the robot in response to the sensor data being indicative of the first non-zero amount of depression, and
   the one or more processors are configured to stop the robot in response to the sensor data being indicative of the second non-zero amount of depression.

12. The robot system of claim 11, wherein the layer has a first surface facing the movable part and a second surface opposite the first surface, at least part of the layer has a first thickness when the layer is not depressed, the at least part of the layer has a second thickness that is less than the first thickness when the layer is depressed by the first non-zero amount of depression, the at least part of the layer has a third thickness that is less than the second thickness when the layer is depressed by the second non-zero amount of depression, and the first, second, and third thicknesses are measured from the first surface to the second surface of the layer.

13. A method of controlling a robot, the method comprising:
   with a sensor layer covering at least some of a movable member of the robot, generating sensor signals indicative of an external object that applies a force to the sensor layer that teaches a motion of the movable member to the robot;
   with an actuator, moving the movable member according to the motion when the sensor signal is within a range of values between a first threshold value and a second threshold value, the first threshold value being associated with a first non-zero amount of depression of the sensor layer towards the movable member and the second threshold value being associated with a second non-zero amount of depression of the sensor layer towards the movable member; and
   performing a safety stop of the movable member when the sensor signal is outside the range of values.

\* \* \* \* \*